Sept. 16, 1969　　　　　H. KNAPP　　　　　3,467,764
HEAT AND CORROSION RESISTANT HOSE COUPLING
FOR SUPPLYING FUEL, OIL AND THE LIKE
Filed Aug 1, 1968
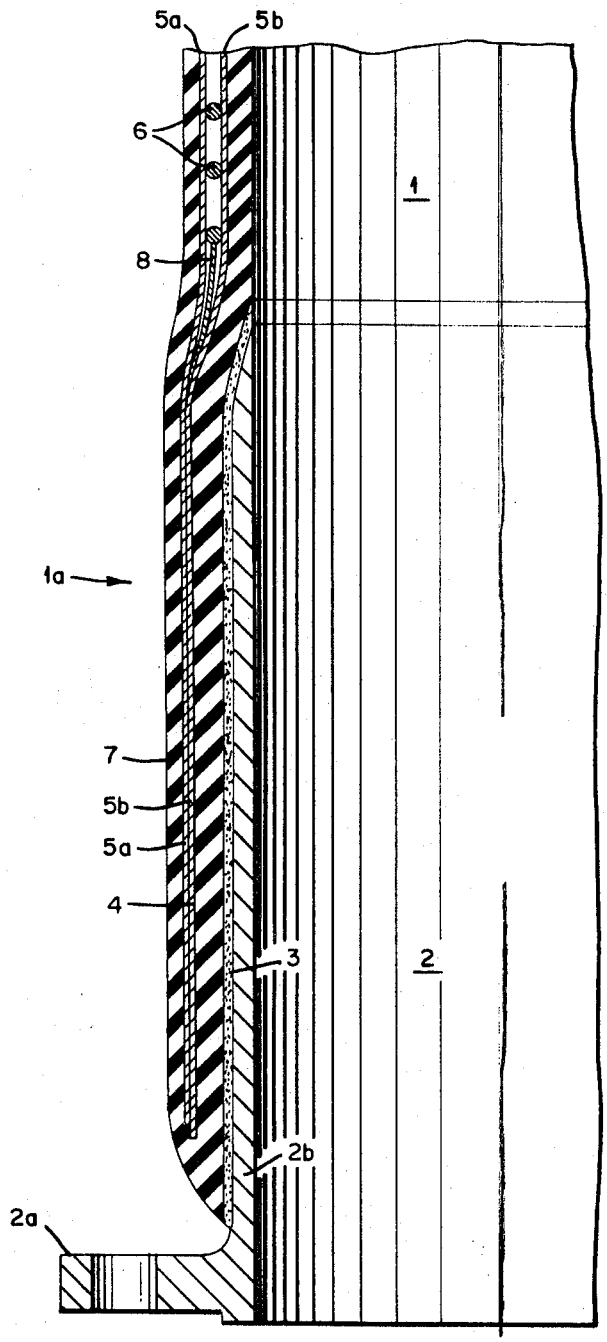
INVENTOR
HEINRICH KNAPP

United States Patent Office

3,467,764
Patented Sept. 16, 1969

---

3,467,764
HEAT AND CORROSION RESISTANT HOSE COUPLING FOR SUPPLYING FUEL, OIL AND THE LIKE
Heinrich Knapp, Bad Blankenburg, Thuringia Wald, Germany, assignor to VEB Transportgummi, Bad Blankenburg, Thuringia Wald, Germany
Filed Aug. 1, 1968, Ser. No. 749,545
Int. Cl. H02g 15/02
U.S. Cl. 174—74                8 Claims

ABSTRACT OF THE DISCLOSURE

The heat resistant and electrically conductive rubber layer of the hose is firmly connected with a corrosion resistant zinc or cadmium containing fitting by means of an adhesive cobalt compound dissolved in rubber, or by a rubber solution of heavy metal salts of a branched aliphatic organic acid having a chain length of $C_4$ to $C_{10}$.

BACKGROUND OF THE INVENTION

Field of the invention

The present invention relates to the coupling of a hose for supplying fuel, oil and the like.

In particular, the present invention relates to a temperature and oil resistance and electrically conductive hose which is firmly coupled with a corrosion resistant metal fitting.

Prior art

In conventional hose couplings the terminal fitting is attached to the hose either by forcing or screwing the connecting tubular piece of the fitting into a completed hose, or by attaching it simultaneously with the formation of the hose such as by vulcanizing it to the hose during the manufacturing process.

One of the disadvantages of the hose coupling where the fitting has been attached to a completed hose resides in that such couplings can only be used at higher pressures due to the insufficient pluck-out resistance thereof. Moreover, these couplings require a complicated shape both of the fitting and of the abutting surface of the hose, such as profiled sleeve with a clamp collar or extended and reinforced hose sleeves, and the like. Consequently, these couplings are costly to produce and install.

On the other hand, the hose couplings where the terminal fitting has been attached to the hose during the manufacturing process, show an increased pluck-out strength, nevertheless the production costs are just as high as in the case of the first mentioned couplings.

There are also known hose couplings where the hose is provided with intermediate insertions whereby the fitting is either firmly connected to those insertions or attached thereto by means of lugs, hooks, pins or, as in case of metal insertions, by soldering to the fitting piece.

Furthermore, there are known hose couplings upon which a metal flange ring is disposed during the manufacturing thereof, and the ends of the hose are provided with projecting edges against which the flange ring abuts. In another modification, the hose is terminated with rubber flanges which are also reinforced by metal rings.

Finally, there are also known hose couplings comprising elastomer layers which are connected to the fitting by utilizing the adhesive properties thereof. However, when the adhesion is applied to conventional fittings which are mostly made from steel or brass, there results either an inferior corrosion resistance as in case of steel fittings or, as in case of brass fittings the latter cannot be exposed to atmospheric conditions prior to the vulcanization of the hose, since if the moisture content of the air exceeds 15%, the rubber will not adhere to the metal. Of course, it is possible to attain a good adhesion of rubber hoses to fittings of brass or other metal by means of binding or adhesive materials known from prior art, nevertheless the resulting coupling has an insufficient temperature resistance and, consequently, it can be employed up to the maximum temperature of about 100° C.

For making the known rubber hoses electrically conductive, metal electrical conductors such as copper braiding, for example, are disposed in the hose and are connected to the metal fitting. In another variation, one or more metal spirals reinforcing the hose have been clamped or soldered to the terminal fitting to serve as conductors. In both instances there is a disadvantage in that the connection of the metal conductor to the fitting of the hose requires additional manufacturing steps or, when electrically non-conductive spirals are employed, conductor bodies must be added to the completed hose.

BRIEF SUMMARY OF THE INVENTION

It is accordingly a primary object of this invention to provide a hose coupling for supplying fuel, oil and the like, which is heat and corrosion resistant and electrically conductive.

Another object of the present invention is to provide a hose coupling wherein the terminal fitting is integral with the hose, and which can be manufactured at minimum costs.

It is a further object of this invention to provide a hose coupling wherein the terminal fitting has a simple structure and the structure of the hose enables a heat and corrosion resistant adhesion or vulcanization thereof to the fitting so as to create a stable metal-to-rubber connection even under unfavorable atmospheric conditions of manufacturing and in which the ends of the hose are formed without any special reinforcing elements, and the entire hose is made without additional electrically conductive bodies, clamps or soldering points.

In accordance with a primary feature of the present invention, a hose coupling for supplying fuel, oil and the like has at least the inner surface thereof made of an elestomeric (rubber) material comprising ingredients, such as acetylene soot, which impart electrical conductivity to the elastomer. The inner surface of the hose is firmly connected to a zinc or cadmium fitting by means of an adhesive layer which comprises a rubber solution of a cobalt compound or a rubber solution of a heavy metal salt of a branched aliphatic organic acid having a chain length from $C_4$ to $C_{10}$.

BRIEF DESCRIPTION OF THE DRAWINGS

The invention is illustrated by way of example in the accompanying drawing which forms part of the application and in which the single figure is a broken section of the hose coupling of this invention.

DETAILED DESCRIPTION OF A PREFERRED EMBODIMENT

Referring now to the figure, there is illustrated therein a hose coupling 1a which includes a tubular fitting 2 terminated in a flange 2a, and a multilayer hose 1 firmly connected to the fitting 2 by means of an adhesive layer 3. The fitting 2 can be made of zinc or cadmium, or of a zinc or cadmium-containing alloy, or of any corrosion resistant metal having zinc or cadmium plating. The hose comprises an inner layer 4 and an outer layer 7, both layers being made from an oil and heat resistant elastomer, such as rubber, which includes acetylene soot to insure electroconductive properties of the hose. Between the inner and outer layers, two reinforcing layers 5a and 5b of textile material are interposed and, in the region above the connection with the fitting, the layers 5a and 5b abut each other so that the hose end forms a connecting sleeve having an increased diameter. At the transition area of the connecting sleeve to the proper hose, the respective textile layers 5a and 5b are separated and, at this point of bifurcation thereof, a supporting band 8 is provided. In the remaining portion of the hose, a reinforcing spiral 6 is situated between the separated textile layers 5a and 5b.

The corrosion and heat resistant connection of the fitting 2 to the inner layer 4 of the hose is carried out by an adhesive layer 3 which is disposed on the zinc-plated fitting 2b and contains a rubber solution of 1.6 percent of cobalt-rhodan complex made from the equivalent amounts of $CoC_{12}CH_2O$ and $NH_4SCN$. The contacting inner layer 4, as well as the protecting outer layer 7 are made of relatively thick oil-resistant rubber.

In another embodiment of the invention, the binding layer 3 can be made from a rubber solution of a heavy metal salt of an aliphatic organic acid having a chain length of $C_4$ to $C_{10}$. The resulting hose coupling is characterized by very low production costs whereby the terminal fitting can be attached irrespective of atmospheric conditions. Moreover, the resulting hose coupling is heat and corrosion resistant, secured against plucking-out of the fitting, and no additional conductive elements are to be mounted to the completed hose to insure electrical conductivity thereof.

By proper dimensioning of the textile reinforcing interlayers the hose coupling may withstand testing pressures as high as 30 kg./cm.²

What is claimed is:

1. A heat and corrosion resistant hose coupling comprising a hose having at least one surface comprising an oil-and heat resistant elastomer, a fitting having at least one surface comprising a corrosion resistant metal, said surface of the fitting being connected to said surface of the hose by an adhesive layer containing a rubber solution of a cobalt compound.

2. The hose coupling according to claim 1 wherein said corrosion resistant metal is zinc.

3. The hose coupling according to claim 1 wherein said corrosion resistant metal is cadmium.

4. The hose coupling according to claim 1 wherein at least said surface of the hose is composed of rubber which contains means for producing electric conductivity therein.

5. The hose coupling according to claim 4, wherein said electric conductivity producing means are acetylene soot.

6. The hose coupling according to claim 4, wherein said hose comprises an inner rubber layer, two intermediate reinforcing layers and rubber outer layer, said intermediate reinforcing layers abutting each other in the region of connection of the hose with the fitting and, in the remaining region of the hose, being separated from each other for receiving a reinforcing spiral therebetween.

7. The hose coupling according to claim 1, wherein said cobalt compound is a rubber solution of a cobalt-rhodan complex.

8. The hose coupling according to claim 7, wherein said cobalt compound is a 1.6% rubber solution of a cobalt-rhodan complex which is formed from equivalent amounts of $CoC_{12}CH_2O$ and $NH_4 SCN$.

References Cited

Ehlers et al., German printed application No. 1,264,185, published Mar. 21, 1968.

LARAMIE E. ASKIN, Primary Examiner

U.S. Cl. X.R.

174—47; 285—149, 239